(No Model.)
C. D. EDWARDS.
COCKLE SEPARATING MACHINE.
No. 335,902. Patented Feb. 9, 1886.
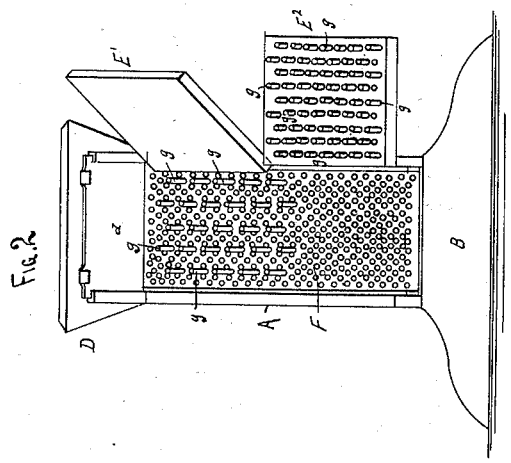
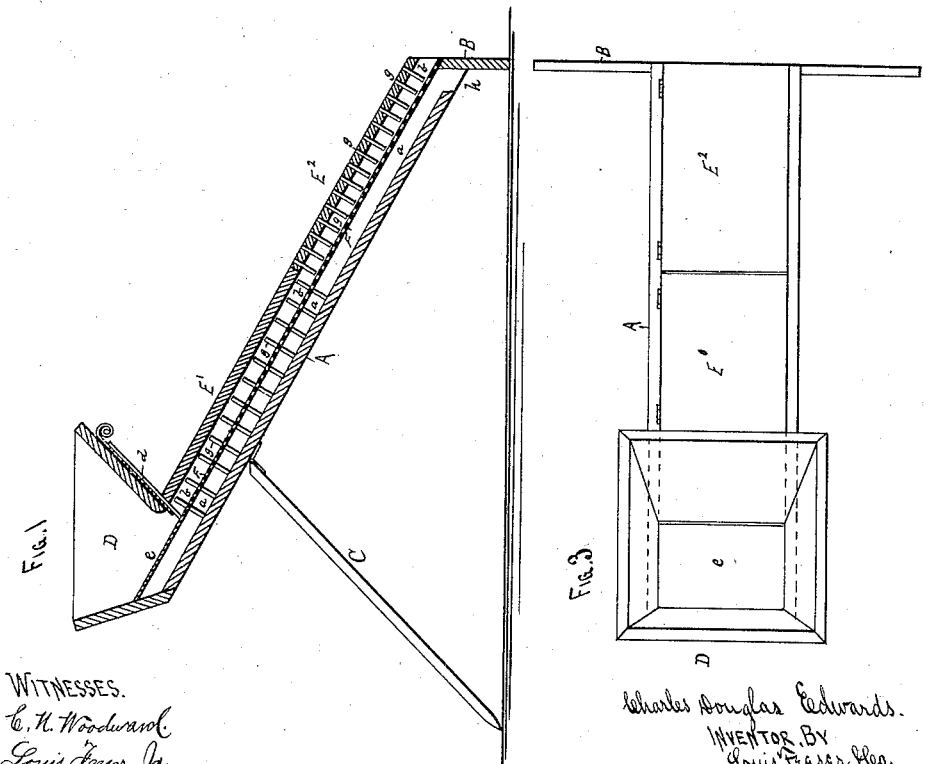

UNITED STATES PATENT OFFICE.

CHARLES DOUGLAS EDWARDS, OF ALBERT LEA, MINNESOTA.

COCKLE-SEPARATING MACHINE.

SPECIFICATION forming part of Letters Patent No. 335,902, dated February 9, 1886.

Application filed March 30, 1885. Serial No. 160,608. (No model.)

*To all whom it may concern:*

Be it known that I, CHARLES DOUGLAS EDWARDS, a citizen of the United States, and a resident of Albert Lea, in the county of Freeborn, in the State of Minnesota, have invented certain new and useful Improvements in Cockle-Separating Machines, of which the following specification is a full, clear, and exact description, reference being also had to the accompanying drawings, in which—

Figure 1 is a sectional side elevation. Fig. 2 is a front view with the covers open, and Fig. 3 is a plan view with the covers closed.

This invention relates to machines for separating cockle and other deleterious seeds from wheat; and it consists in the construction and arrangement of parts, as herein shown and described.

In the drawings, A is a trough-shaped frame having a foot, B, across its forward or lower end, a hinged leg, C, beneath its rear or upper end, a feed-hopper, D, on its upper end, and a cover formed in two parts, E' E².

Within the casing A is suspended a perforated metal screen, F, leaving a space, $a$, between the perforated metal and the bottom of the casing, and a space, $b$, between the perforated metal and the cover E' E². The hopper D is arranged to open into the space $b$ only, and is provided with a slide, $d$, to regulate or shut off the flow of the grain.

In the drawings, a metal bottom, $e$, forming an extension to the perforated metal F, is arranged within the hopper to guide the grain upon the perforated plate; but any other suitable construction may be used that will accomplish the same result—viz., to insure the passage of the grain from the hopper to the upper surface of the perforated plate. At regular intervals the plate F is provided with pegs $g$, which project up into the space $b$, as shown, to act as retarders to the grain as it flows down the inclined plate and break its current up into zigzag lines, and insure the escape of the cockle and other seeds which it is desired to separate from the wheat. The perforations in the plate F being circular, and its inclination being adjusted by setting the hinged leg C forward or backward, the cockle, pigeon-grass, and other deleterious seeds, as well as the shrunken wheat berries which are smaller than the full-grown and plump wheat berries, will fall through the perforations in the plate F and flow down the bottom board of the casing A and drop out through an opening, $h$, in the rear of the foot B, while the large full wheat berries will, by their peculiar oblong form run over the perforations in the plate F and be discharged over the foot B, this foot thus forming a partition between the good wheat and the small shrunken wheat, cockle, &c. The pegs $g$ are shown driven down through the perforations in the plate F into the bottom of the casing A, which is a very simple and convenient method of arranging them; but they may be inserted into the underside of the cover or covers E' E², as shown in Figs. 1 and 2, if preferred, or a portion may be arranged one way and a portion the other, as shown. When inserted into the covers E' E², the pegs do not obstruct the flow of the grain in the space $a$, which is one of the advantages of this construction. As before stated, the inclination of the screen may be adjusted by moving the lower end of the leg C nearer to or farther away from the foot B, so as to adapt the inclination of the screen to the condition or quality of the grain to be treated.

Any equivalent of the adjustable leg C for adjusting the inclination of the screen may be used.

Under some conditions of the grain it may be found advantageous to retard its passage down the inclined screen to a less extent than when treating ordinary grain, and by opening the section E² of the cover, having the pegs $g$ attached, as shown in Fig. 2, the lower part of the screen is left unobstructed; hence the grain will flow much more rapidly down its surface, thus insuring a more rapid separation than could be secured if the grain were retarded by the pegs for its whole length.

Having described my invention and set forth its merits, what I claim is—

A cockle-separator comprising a casing, A, having a foot, B, adjustable support C, hopper D, and cover or covers E' E², a perforated screen, F, suspended within the said casing and leaving spaces $a$ $b$ above and below it, and pegs $g$ $g$, substantially as and for the purpose herein specified.

In testimony whereof I have hereunto set my hand in presence of two subscribing witnesses.

CHARLES DOUGLAS EDWARDS.

Witnesses:
HEMAN BLACKMER,
C. H. WEBSTER.